(12) United States Patent
Schmitt et al.

(10) Patent No.: US 6,809,530 B2
(45) Date of Patent: Oct. 26, 2004

(54) SENSOR FOR DETECTING CONDENSATION AND USE IN A SENSOR MODULE

(75) Inventors: Hans-Michael Schmitt, Muennerstadt (DE); Juergen Bach, Bad Neustadt (DE); Guenther Oennig, Niederlauer (DE); Thomas Polzer, Bad Neustadt (DE); Martin Blaufuss, Suelzfeld (DE); Rudolf Hartmann, Salz (DE)

(73) Assignee: Preh-Werke GmbH & Co., KG, Bad Neustadt (DE)

( * ) Notice: Subject to any disclaimer, the term of this patent is extended or adjusted under 35 U.S.C. 154(b) by 32 days.

(21) Appl. No.: 10/281,360

(22) Filed: Oct. 28, 2002

(65) Prior Publication Data

US 2003/0086475 A1 May 8, 2003

(30) Foreign Application Priority Data

Oct. 26, 2001 (DE) ........................................ 101 52 999

(51) Int. Cl.[7] ............................................. G01R 27/26
(52) U.S. Cl. ...................................... 324/689; 374/208
(58) Field of Search ........................... 324/689; 374/208

(56) References Cited

U.S. PATENT DOCUMENTS

| | | | |
|---|---|---|---|
| 5,568,977 A | | 10/1996 | Gschwind et al. |
| 5,751,071 A | | 5/1998 | Netzer |
| 5,789,670 A | * | 8/1998 | Scherer et al. ............ 73/170.17 |
| 5,929,534 A | * | 7/1999 | Pickett ....................... 307/10.1 |
| 6,373,263 B1 | * | 4/2002 | Netzer ........................ 324/665 |
| 6,420,036 B1 | * | 7/2002 | Varaprasad et al. ......... 428/432 |

FOREIGN PATENT DOCUMENTS

| | | |
|---|---|---|
| DE | 3721659 | 1/1989 |
| DE | 39 11 812 C2 | 10/1990 |
| DE | 43 16 557 A1 | 11/1994 |
| DE | 695 04 803 T2 | 6/1996 |
| DE | 196 16 715 A1 | 11/1997 |
| DE | 101 04 942 A1 | 8/2001 |
| WO | WO 01/58731 A1 | 8/2001 |

OTHER PUBLICATIONS

"Feuchtesensor fuer Klimaautomaten," ATZ Automobiltechnische Zeitschrift 102 (2000) 1, p. 42–44.

* cited by examiner

*Primary Examiner*—Charles H. Nolan, Jr.
(74) *Attorney, Agent, or Firm*—Birch, Stewart, Kolasch & Birch, LLP

(57) ABSTRACT

As is well known, the influencing variables most important for a sense of comfort are considered during regulation in controlled heating and air conditioning units. Incipient condensation on the windshield or other windows in particular is to be prevented thereby. Sensor modules, inter alia, are employed for this purpose, which have, for example, a capacitative thin-layer sensor. An additional thermopile is provided for determining the window temperature. The present idea eliminates the determination of the window temperature, for which purpose a sensor working capacitatively in the exemplary embodiment is brought directly to the window temperature and a direct thermal coupling of the sensor with the window occurs via a metal plate connected directly to the sensor and a thin adhesive film. The metal plate can thereby form one of the electrodes of the sensor itself or be connected to said electrode in a direct thermal manner. The use of the sensor in the sensor module is a further preferred embodiment.

24 Claims, 1 Drawing Sheet

SENSOR FOR DETECTING CONDENSATION AND USE IN A SENSOR MODULE

This nonprovisional application claims priority under 35 U.S.C. §119(a) on Patent Application No. 101 52 999.6 filed in Germany on Oct. 26, 2001, which is herein incorporated by reference.

BACKGROUND OF THE INVENTION

1. Field of the Invention

The present invention relates to a sensor for detecting for condensation on a window, especially a vehicle window, and the use thereof in a sensor module.

2. Description of the Background Art

As is known in the conventional art, the influencing variables most important for a sense of comfort are considered during regulation in controlled heating and air conditioning units. Incipient condensation on the windshield or other windows, in particular, is to be prevented thereby. Condensation occurs when at a given relative humidity in the vehicle through external effects the window temperature is or becomes colder than the air temperature in the interior, and thus the temperature on the interior side of the window falls below the dew point. An increase in interior humidity also raises the risk of condensation formation. Condensation or moisture sensors are used for detection.

A device for detecting the degree of dew formation or icing of a vehicle window is disclosed in DE 43 16 557 A1. A small-scale sensor provides a signal about the degree of the dew formation or icing of a large window pane area. In this case, the sensor is connected with the vehicle window in a heat-conducting manner, which is performed by gluing the sensor to the vehicle window. The sensor itself is connected to an evaluation unit via external lines. Based on the information from the evaluation unit, countermeasures, e.g., turning on of a fan motor, are activated at a proper time.

DE 695 04 803 T2 discloses a device for defogging vehicle windows. A combined temperature sensing element and moisture sensor are glued onto the windshield.

A generic capacitive moisture sensor for air conditioning units is presented in an article in ATZ Automobiltechnische Zeitschrift 102 (2000)1 on pages 42–44, in regard to both structure and function. The capacitive moisture sensor is housed in a module, which has a thermopile for measuring the window temperature. The relative humidity is determined with use of the described capacitive thin-layer sensor. This sensor at a predefined temperature, provides the ratio of the existing humidity and the maximum possible humidity. When the maximum possible humidity is reached, the corresponding temperature is described as the dew point. If the dew point on the windshield apron is calculated by using the measured relative humidity and temperature, then if the window surface temperature is known, the difference of the two signals will provide a value as an indicator for condensation formation.

SUMMARY OF THE INVENTION

It is therefore an object of the present invention to describe a sensor for detecting wetting or incipient condensation on the surface of a window.

The invention is based on the idea of bringing a sensor directly to the window temperature, so that an otherwise necessary determination of the window temperature is not required, because the sensor assumes the temperature of the window and thus a tendency for condensation can be determined immediately. Only the relative moisture on the window is measured, whereby the thus measured window moisture represents a direct indication for the tendency for condensation. Through the direct thermal coupling of the sensor to the window, the sensor exhibits virtually no time delay for detection.

The direct thermal coupling occurs preferably via a metal plate, which simultaneously forms the bottom of the sensor, whereby the metal plate ends flush with the lower side of the sensor or of the sensor housing and thus in functional use with the window.

The sensor can be glued onto the window by means of a thin film with a high thermal conductivity.

In a preferred embodiment, the sensor is integrated into a sensor module, thereby creating a small-scale sensor module, which preferably also contains evaluation electronics. The sensor module can be preferably integrated on or in a base of an interior mirror. The evaluation electronics of the module are protected by the sensor housing against external effects.

In a further embodiment, the capacitative operating moisture sensor, for example, consists of two electrodes, with a moisture-sensitive polymer element between them. The direct thermal coupling occurs preferably via one of the electrodes. Alternatively, the metal plate can be used, which is thermally connected to one of the electrodes.

The sensor need not necessarily be made with a polymer film. All other types of moisture sensing elements or sensors can also be used, e.g., with an interdigital structure, resistive elements, etc.

In an improvement, the sensor and evaluation electronics are placed in a small common housing.

In a further embodiment, the window temperature can be measured with use of a temperature sensor, which is preferably also integrated into the module, if a relative humidity in the vehicle interior is to be determined with this sensor module. The relative humidity can then be obtained from the determined window moisture, window temperature, and temperature in the passenger compartment. An additional interior moisture sensor is not necessary. Nonetheless, in this indirect humidity determination, the actual moisture in the passenger compartment is also determined as a function of influencing variables in the passenger compartment, such as the number and temperature of the passengers themselves.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
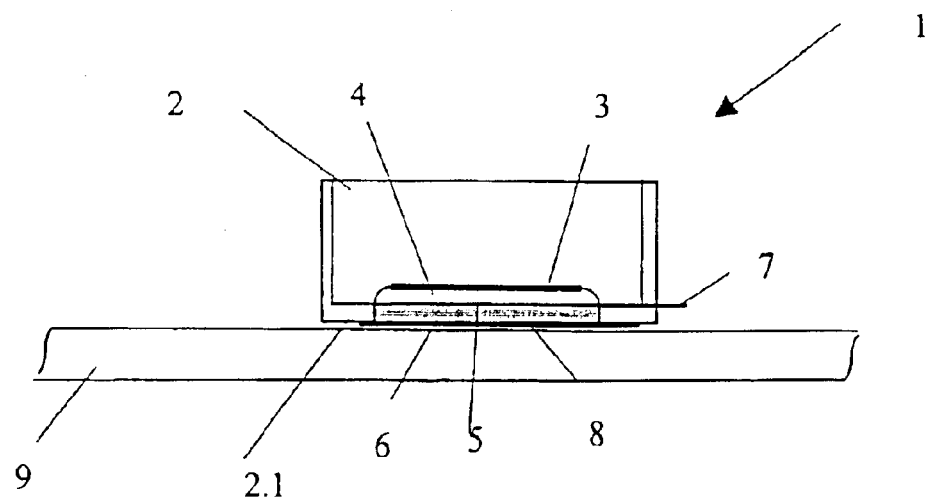
FIG. 1 is a side view of a sensor according to the invention.

FIG. 1 illustrates a capacitative operating sensor 1 in a sensor housing 2, which is formed by two electrodes 3, 5 and a conductive, moisture-sensitive material 4, for example, a polymer layer, located between said electrodes. The second electrode 5 is connected to a metal plate 6 at least thermally. The metal plate 6 ends with the lower side 2.1 of the housing 2 and preferably has the same outer dimensions as the electrode 5. A connection 7 extends from the electrode 5, and can be electrically connected to an evaluation unit.

The housing 2, at least in the area of the metal plate 6, has a thin film 8 for thermal connection to a window 9. The film 8 has a high thermal conductivity and good adhesion. For example, an aluminum oxide with adhesive components can be provided as the film 8, so that the sensor 1 is glued with its bottom side 2.1 flush to the window 9.

The direct connection of one of the electrodes of the sensor 1 via the metal plate 6 to the window 9 assures that the sensor 1 can be brought to the temperature of the window almost instantly, because the metal plate 6 assumes the temperature of the window 9 and passes it to an electrode 5. It is not described further, but the electrode 5 may replace the metal plate 6, so that the direct thermal coupling with the window 9 is made via the electrode 5.

The capacitance of sensor 1 changes because of the change in moisture on the window 9, and is thus a direct value of the moisture on the window 9, without needing to know the window temperature needing to be known.

Figure 2:
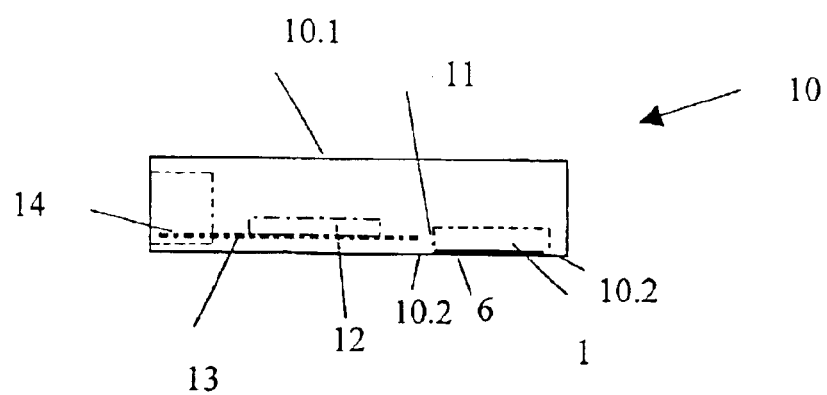
FIG. 2 is a modular structure of a sensor unit with the sensor of FIG. 1.

FIG. 2 shows a sensor module 10 with the sensor 1. The sensor 1 is connected via a connector 11 directly to a conductive plate 13, combining evaluation electronics 12 or portions thereof, and placed in the common housing 10.1, which is preferably made of plastic. The metal plate 6 or the electrode 5 of the sensor 1 are thereby held by a plastic frame 10.2 of the housing 10.1, whereby the flush fit with the housing 10.1 is assured. The module 10 can be connected to other electronic components (not described further) via plug connections 14.

It is possible, with the present invention, to make module 10 very small. Thus, module 10 preferably has a length of about 30 mm, a width of 20 mm, and a height of 4 mm. This permits possible integration into the base of an interior mirror, e.g., a rear view mirror.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor for detecting condensation on a window, the sensor directly attaining a temperature of the window such that a direct thermal coupling of the sensor with the window occurs so that a temperature of the sensor is substantially equal to a temperature of the window, wherein condensation on the window is detected on the basis of a chance in capacitance in the sensor.

2. The sensor according to claim 1, wherein the direct thermal coupling occurs via a metal plate, which forms a bottom of the sensor, and wherein a lower surface of the metal plate is flush with the window.

3. The sensor according to claim 1, wherein a metal plate, which is provided in the sensor for the direct thermal coupling, is fixed onto the window by an adhesive with a high thermal conductivity.

4. The sensor according to claim 1, further comprising two electrodes, and a conductive, moisture-sensitive material disposed between the two electrodes, wherein the direct coupling with the window occurs via one of the electrodes and an adhesive with high thermal conductivity.

5. The sensor according to claim 4, wherein the direct thermal coupling of the sensor with the window occurs via a metal plate, which is connected to one of the two electrodes in a direct thermal manner.

6. The sensor according to claim 4, wherein the metal plate or one of the two electrodes is held in a plastic frame.

7. The sensor according to claim 4, wherein the moisture-sensitive material is a polymer.

8. A sensor module for detecting condensation on a window, said sensor module including a sensor that directly attains a temperature of the window such that a direct thermal coupling occurs so that a temperature of the sensor is substantially equal to a temperature of the window, wherein condensation on the window is detected on the basis of a change in capacitance in the sensor.

9. The sensor module according to claim 8, wherein evaluation electronics are integrated into the module.

10. The sensor module according to claim 8, wherein the module is surrounded by a housing, and wherein an electrode of the sensor or a metal plate is held by the housing of the module with ends of the metal plate being flush with the housing.

11. The sensor module according to claim 10, wherein the electrode or the metal plate is held by a plastic frame of the housing.

12. The sensor module according to claim 8, wherein a temperature sensor can be integrated into the module.

13. The sensor module according to claim 8, wherein the module is built on a small scale and has the dimensions of being approximately 30 mm wide by 2.0 mm high by 4 mm deep.

14. The sensor module according to claim 8, wherein the sensor module can be preferably integrated in or on a base of an interior mirror.

15. The sensor according to claim 1, wherein the window is a vehicle window.

16. The sensor according to claim 3, wherein the adhesive is a thin film or glue.

17. The sensor module according to claim 14, wherein the sensor module is positioned between the window and the base of the interior mirror.

18. A sensor comprising:

a first electrode;

a second electrode; and a conductive moisture-sensitive material being provided between the first electrode and the second electrode, wherein the sensor is in direct thermal coupling with a window, wherein a temperature of the sensor is substantially equal to a temperature of the window during a sensing operation, and wherein moisture is detected on the window on the basis of a change in capacitance between the first electrode and the second electrode.

19. The sensor according to claim 18, wherein the second electrode is fixed to the window in order to provide the sensor with the direct thermal coupling to the window.

20. The sensor according to claim 18, wherein the sensor further comprises a metal plate that is fixed to the window for promoting thermal transfer from the window to the sensor.

21. The sensor according to claim 20, wherein the metal plate is thermally connected with the second electrode.

22. The sensor according to claim 18, wherein the sensor is affixed to the window via an adhesive.

23. The sensor according to claim 22, wherein the adhesive promotes thermal conductivity.

24. A method for detecting condensation on a window, the method comprising the steps of:

providing a sensor directly to the window so that the sensor is in direct thermal coupling with the window so that a temperature of the sensor is substantially equal to a temperature of the window, the sensor having a conductive moisture-sensitive material provided between a first and second electrode;

determining a change in capacitance between the first electrode and the second electrode; and detecting moisture on the window on the basis of the change in capacitance between the first electrode and the second electrode.

* * * * *